Aug. 24, 1937.　　C. D'ASCANIO　　2,091,029
ADJUSTABLE PROPELLER
Filed July 18, 1934　　2 Sheets-Sheet 1

Inventor:
Corradino d'Ascanio
By [signature]
Atty.

Aug. 24, 1937.  C. D'ASCANIO  2,091,029
ADJUSTABLE PROPELLER
Filed July 18, 1934   2 Sheets-Sheet 2
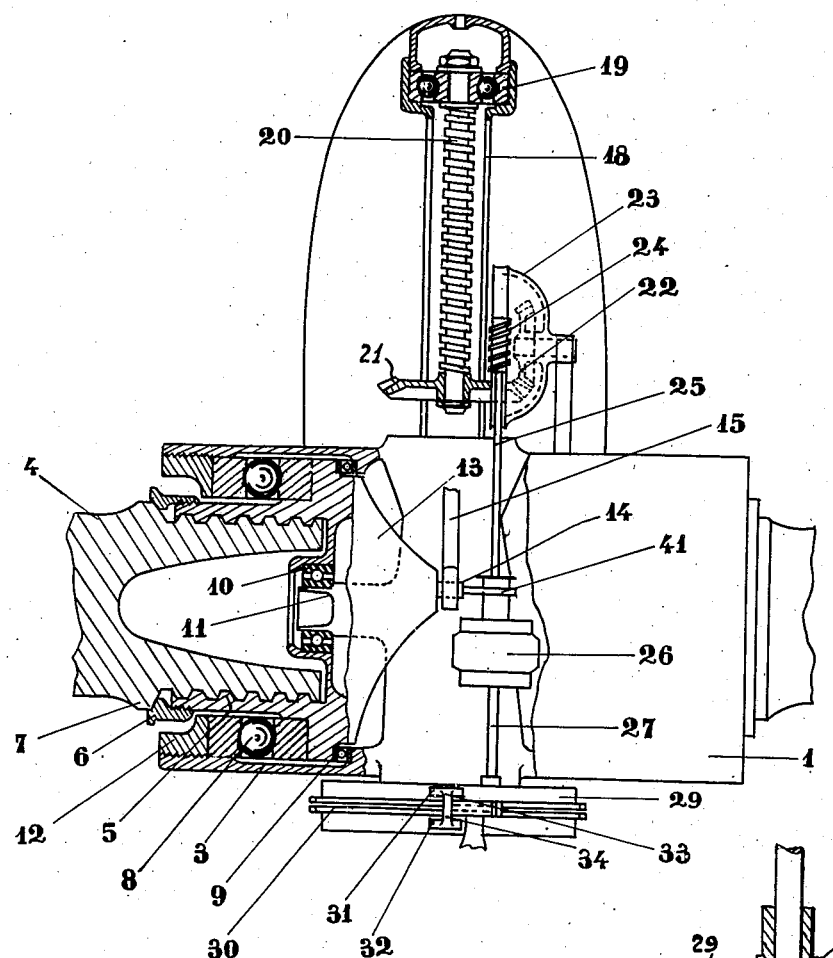

Patented Aug. 24, 1937

2,091,029

UNITED STATES PATENT OFFICE 2,091,029

ADJUSTABLE PROPELLER

Corradino D'Ascanio, Genoa, Italy, assignor to Piaggio & Co., Soc. An., Genoa, Italy, a joint-stock company of Italy Application July 18, 1934, Serial No. 735,734 In Italy June 12, 1934

4 Claims. (Cl. 170—163)

The object of the present invention is to produce an adjustable propeller for airplanes and the like provided with two blades, the pitch of which can be altered at will during flight. My invention is characterized by certain innovations and new details of construction relating to the mounting of the blades on the hub, by the means for the control of the pitch, and by the means for indicating at a distance the position of the blades.

More particularly the said innovations and details of construction forming the principal characteristics of the present invention, consist in that the hub carries two or more sleeves, one for each blade, for attaching the blades thereto, within which sleeves are inserted the spindles of the blades, to the ends of which a holding member is screwed, the said member being connected to its corresponding sleeve by means of suitable bearings or ball races, so that the blade, although free to turn round its longitudinal axis for the variation of the pitch, remains locked to the hub in the longitudinal or radial direction.

The rotary movement of the blades is obtained by means of a stem integral with the said member, which is connected by means of connecting rods, to a central member, adapted to slide axially on a suitable bearing. This central sliding member is caused to move under the action of a screw fixed axially to the bearing, and connected to suitable gearings operated by the rotation of the hub, the control of the movement of turning of the blades round their own axes being effected by means of a friction brake controlled by the pilot, said brake acting on one of the elements of the gearing.

Another object of this invention is to insure the automatic unlocking of the pitch gear mechanism, said unlocking being effected by the turning movement of the blades round their own axes when they have reached the end positions of the angular movement allowed to them.

Another feature of this invention has reference to the hub, and consists in a device adapted to transmit to the control board or to any other convenient place, the indication of the incidence of the blades, said device consisting in a system of gearings connected with the variable pitch gearing above referred to. The said transmitted indications give only the differential displacement between the position of the element arrested by the control brake, and that of the element geared with it, connected to the variable pitch gear.

Other particular features of the hub for air propellers according to this invention, will appear from the following description and the appended claims.

My invention is illustrated schematically on the annexed drawings, on which:

Fig. 2 shows the same hub in side view, partly in section;

Fig. 3 is a section through the automatic unlocking control device;

Fig. 4 is a sectional view, drawn to a larger scale, showing the brake mechanism for stopping the movement of one of the parts of the gearing;

Figures 1, 5:
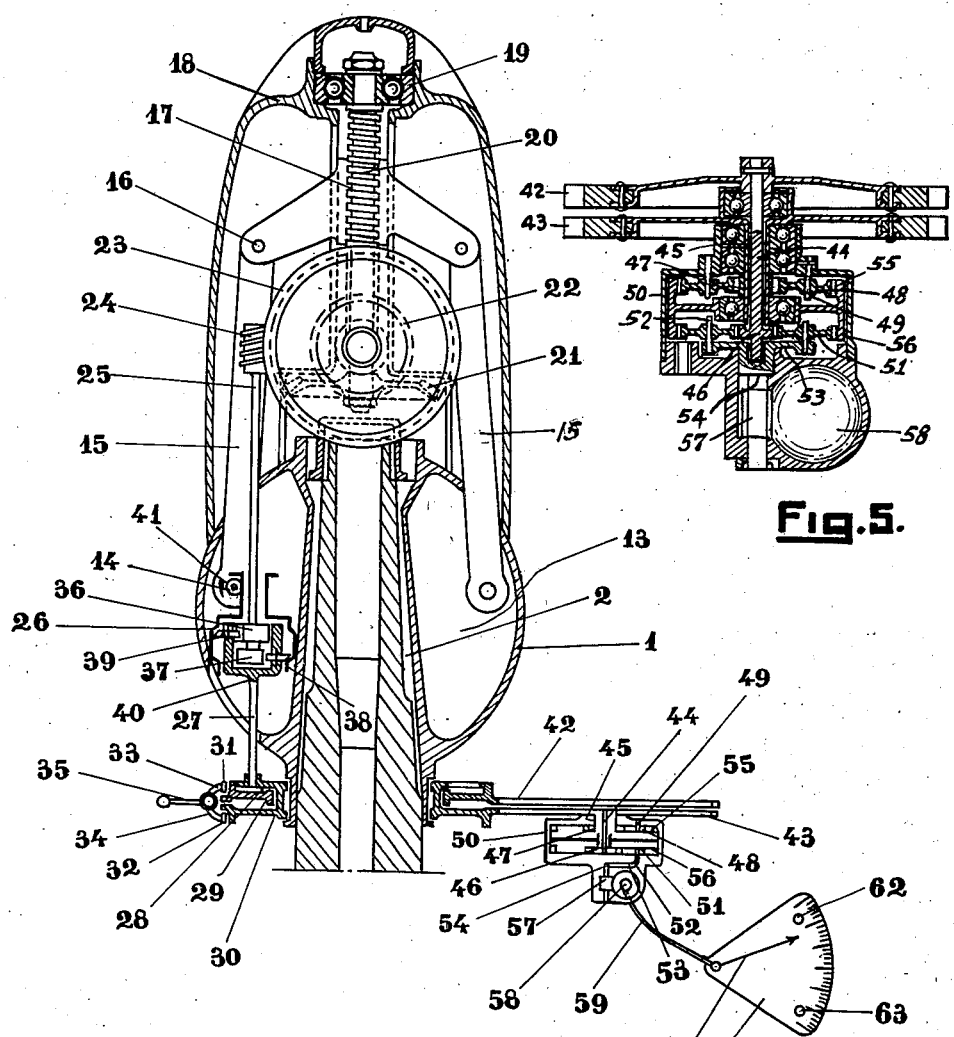
Fig. 1 is a sectional view of the hub in a plane normal to the axis of the blades.
Fig. 5 is a sectional view, on an enlarged scale, of the device for reproducing on the control board the indication of the angular positions of the blades.

The hub as shown, is formed by a main body 1 provided in its inner central part with a housing 2 adapted for inserting the hub on the motor head, two or more sleeves 3 being provided, one at each side of the hub, for the attachment therein of the propeller blades.

The stem 4 of each blade is screwed to a holding member 5, and is kept locked thereon by the threaded bush 6 which is provided with a conical seating forcibly bearing against the conical collar 7 of the blade stem 4.

The holding member 5 is provided externally with suitable recesses for receiving therein the ball races 8 and 9.

The member 5 is also provided at the centre of its bottom end with a suitable housing for the bearing 10, which is fitted at the end of the arm 11 integral with the central body 1.

A suitable threaded ring 12, screwed into the sleeve 3, serves to fix tightly, through the said ball races 8 and 9, the member 5, and consequently the stem 4 of the corresponding blade, to the said sleeve.

The blade connected to the hub in the manner above described is thus rigidly inserted into the hub, although it may turn freely round the axis of the ball races.

The centrifugal force is transmitted through the race 8 to the ring 12 and then on the sleeve 3, while the torque set up by the aerodynamical reactions on the blades is also transmitted on to the sleeve 3 through the system of the two races 8 and 9, and of the thrust bearing 10.

The holding member 5 carries, eccentrically in respect to its axis, a rib 13, with a pivot 14 at its end, on which is pivoted the end of a connecting rod 15, the other end of which is connected, through another pivot 16, to a suitable arm (one for each blade) of the sliding member 17, adapted to slide axially, being guided inside suitable housings provided in the central bearing 18.

Upon the said central bearing 18, which is connected to the central body 1 of the hub is fixed an end thrust bearing 19, on which is fixed the upper end of a screw 20. This screw passes through the sliding member 17, through the nut integral with it.

Said screw 20 carries keyed to its end a bevel wheel 21, which engages with another bevel wheel 22 suitably supported by the central body; the wheel 22 is rigidly connected to the helicoidal wheel 23, which meshes with the endless screw 24.

The screw 24 is keyed at the end of a thin shaft 25, which, by the interposition of the coupling 26, hereinafter described, and through the thin shaft 27, disposed in alignment to the shaft 25, takes up the movement on the rear part of the hub by means of the pinion 28. This pinion 28 meshes with a crown wheel 29 provided internally with teeth, and with the wheel 30, both these latter being supported coaxially with the central body of the hub.

Both the crown wheel 29 and the wheel 30 are provided with suitable annular projections or ribs, adapted to receive the sliding pressure of the brake blocks 31 and 32, which blocks are actuated by the arms 33 and by the lever 35 controlled by the pilot, so that the latter can apply the brake and stop the movement of one of the wheels 29 or 30 above mentioned.

By rotating the hub round its axis, after stopping of the crown wheel 29 or the wheel 30 as described, the pinion 28 is caused to rotate round the wheel which has been stopped.

This rolling of the pinion 28 causes the rotation of the shaft 27 on which it is fixed, and consequently also the rotation, in either direction, of the gear formed by the screw 24, the wheels 23, 22, and 21, and consequently the turning, in either direction, of the propeller blades round their own axes.

In order to provide for the automatic unlocking of the system of gearings operating the movement of the blades, a coupling 26 is inserted, as already mentioned, between the shafts 25 and 27. This coupling is formed as follows:

Two ratchet wheels 36 and 37 are mounted rigidly on the shaft 25. These wheels each have their teeth oriented in the opposite direction to the other, and the corresponding pawls 38 and 39 of these wheels are pivoted on a suitable support 40 integral with the shaft 27. The said pawls with respect to their axes of rotation, are heavier externally thereto, and abutting slightly outside of the periphery of the support 40; consequently, under the action of the centrifugal force, the said pawls have a tendency to remain always in engagement with the respective tooth on the ratchet wheels thus permitting the normal transmission of the movement in either direction, from the shaft 27 to the shaft 25; externally with respect to the support 40 is placed the clutch 26, which, in addition to its movement of rotation together with the ratchet mechanism above described, may also have an axial movement. On the said clutch 26, suitable abutments are provided, which serve to support the end 41 of one of the pivots 14, when the blade has reached the end position of a given angular displacement; if the blade should continue to turn round its axis after passing the said end position, the end 41 will displace in its movement, in either direction, the piece 26, which, because of its special internal cam construction, will cause either one or the other of the pawls 38 or 39 to become disconnected from the respective wheels 37 and 36, thus causing the blades to be released in the direction in which the unlocking of the shaft 25 from the shaft 27 has occurred; in the opposite direction however the interlocking between the two shafts 25 and 27 still operates, and thus it is possible to turn the blades in the other direction.

In order to reproduce on the control board in front of the pilot the exact indication of the angular position of the blades, and consequently also the amount of their pitch, the following device is provided:

On the periphery of the annular ribs of the crown wheel 29 and the wheel 30, teeth are provided, two toothed pinions 42 and 43 meshing thereon, each of which is rigidly connected respectively to the short co-axial shafts 44 and 45.

These short shafts carry at their ends two pinions 46 and 47, respectively. Pinion 47 meshes with the toothed wheel 48 rotatable on the pivot 49 fixed to the casing 50, while the pinion 46 meshes with the toothed wheel 51 rotatable round a pivot 52 fixed to the arm 53 of shaft 54.

Both the wheel 48 and the wheel 51 mesh externally with a pair of crown wheels 55 and 56.

The various ratios of transmission of the gearing of this group are so adjusted that, when the two wheels 29 and 30 rotate at the same speed, that is to say, when the pitch actuating mechanism is not in operation, the peripheral speeds of the pinion 46 and of the lower crown wheel 56 are identical and in opposite directions, and consequently both the pivot 52, and the short shaft 54 fixed to it through its arm 53, remain inactive.

When the control of the system of the variation of the pitch is operated, by the stopping of one of the wheels 29 or 30, as above described, the stoppage of one of the pinions 47 or 46 is effected, causing the pivot 52 and shaft 54 to rotate with a differential movement, and it is clear that the number of revolutions effected by shaft 54 will prove to be always proportional to the number of revolutions of shaft 25, and consequently also to the variation of the pitch.

The rotations above described may be transmitted either directly, or by an endless screw 57 meshing with a helicoidal wheel 58 as shown by way of example, and by means of a flexible shaft 59, or any other suitable means, to the control board in front of the pilot, where on a dial 60 of any convenient shape, the pilot can ascertain the position of the pitch of the blades by the indication of the index finger 61 on the said dial.

Stops 62 and 63 provided on the dial 60, limit the displacement of the index finger 61, in correspondence with the two extreme positions of the blades' pitch, at which positions the automatic unlocking between the shafts 27 and 25 has occurred; but as the index finger is mounted on its spindle by frictional contact, it remains steady on the dial in the same way as the blade in respect to its axis of rotation, even when the control by the pilot continues in the same direction.

I claim:

1. In a hub for airplane or similar propellers having a plurality of blades, sleeves integral with the hub adapted to receive the spindles of the blades so as to permit their turning about their longitudinal axes for the variation of pitch, a holding member for the spindle of each blade, a sliding member mounted on the hub in axial sliding relation thereto, means connecting the holding member to said sliding member, a means adapted to displace said sliding member, gearings operated by the rotation of the hub for actuating said displacing means, a coupling included in said gearings comprising two ratchet-wheels having oppositely directed teeth and pawls adapted to be engaged by centrifugal action, and means intermediate said coupling and the blades to cause the automatic disengagement of one of said pawls from its ratchet wheels through the movement of the blades upon the latter reaching the end positions of their angular displacement.

2. In a hub for airplane or similar propellers having a plurality of blades, sleeves integral with the hub adapted to receive the spindles of the blades so as to permit their turning about their longitudinal axes for the variation of their pitch, a holding member for the spindle of each blade, a sliding member mounted on the hub in axial sliding relation thereto, means connecting said holding member to said sliding member, a means adapted to displace said sliding member for effecting the variation of the pitch of the blades, gearings adapted to be operated by the rotation of the hub for actuating said displacing means, a device for indicating on the control board the angular positions of the blades, said device comprising a toothed crown wheel, a second toothed wheel, pinions meshing with said wheels, two coaxial shafts carrying said pinions, a casing having said two coaxial shafts journalled therein, pinions on the other ends of said coaxial shafts, a system of toothed wheels adapted to be operated by said last-named pinions, a means under the control of the operator for stopping the rotation of either said toothed crown-wheel or said second toothed wheel to thereby enable said gearings to be operated by the rotation of the hub for the variation of the blade pitch, and a shaft operatively associated with said system of toothed wheels for proportionally transmitting to the index member of said indicating device the angular movements of the blades.

3. The combination as specified in claim 1, including a conical seating element secured to said holding member, an abutment on the stem of the blade in forcible engagement with said seating element, a thrust-ball race bearing received in a recess of said holding member being supported by a shoulder thereof, a smaller counter-ball race in opposition to said thrust-ball race so as to secure a tight fitting of said holding member and oppose the torque produced by the resultant of the aerodynamic forces acting on the blades, and a third intermediate thrust ball race adapted to oppose the axial thrust caused by the centrifugal force, and a suitable arm on said holding member adapted to be operatively connected with said sliding member.

4. The combination as specified in claim 1, including means for locking the blade to the hub, comprising a large and a smaller ball bearing disposed in said holding member in opposition to each other, a radial thrust ball bearing disposed intermediate said first two ball bearings in operative relation to these bearings, being fitted in a suitable annular housing provided in the central part of said holding member, an annular abutment on the holding member, and a threaded ring screwed to said sleeve for holding between it and said abutment said large ball bearing, and a shoulder in the hub for supporting said smaller ball bearing.

CORRADINO D'ASCANIO.